United States Patent
Chitrapu et al.

(10) Patent No.: US 7,039,408 B2
(45) Date of Patent: May 2, 2006

(54) METHOD AND APPARATUS FOR INTERCONNECTION OF PERSONAL AREA NETWORKS (PANS)

(75) Inventors: Prabhakar R. Chitrapu, Blue Bell, PA (US); Steven Jeffrey Goldberg, Downingtown, PA (US)

(73) Assignee: InterDigital Technology Corporation, Wilmington, DE (US)

(*) Notice: Subject to any disclaimer, the term of this patent is extended or adjusted under 35 U.S.C. 154(b) by 256 days.

(21) Appl. No.: 10/447,891

(22) Filed: May 29, 2003

(65) Prior Publication Data

US 2004/0092265 A1    May 13, 2004

Related U.S. Application Data

(60) Provisional application No. 60/385,119, filed on Jun. 3, 2002.

(51) Int. Cl.
*H04Q 7/20* (2006.01)

(52) U.S. Cl. ............... 455/438; 455/436; 455/454; 455/552.1; 455/426.1; 709/239

(58) Field of Classification Search ............. 455/426.1, 455/436–445, 517, 552.1, 454; 709/239–242, 709/217–219, 221, 226
See application file for complete search history.

(56) References Cited

U.S. PATENT DOCUMENTS

| | | | |
|---|---|---|---|
| 6,205,128 B1* | 3/2001 | Le ........................... 370/331 |
| 2002/0068566 A1* | 6/2002 | Ohlsson et al. ............ 455/436 |
| 2002/0187780 A1* | 12/2002 | Souissi ..................... 455/426 |
| 2003/0078002 A1* | 4/2003 | Sanjeev et al. ............. 455/41 |
| 2003/0125028 A1* | 7/2003 | Reynolds .................. 455/437 |

* cited by examiner

*Primary Examiner*—Lester G. Kincaid
*Assistant Examiner*—Marcos L Torres
(74) *Attorney, Agent, or Firm*—Volpe and Koenig, P.C.

(57) ABSTRACT

Method and apparatus for facilitating high level handoff decisions performed by a gateway device of a personal area network (PAN) which examines criteria regarding both the devices making up the PAN as well as the enterprise networks which are the subject of the potential handoff.

4 Claims, 4 Drawing Sheets

METHOD AND APPARATUS FOR INTERCONNECTION OF PERSONAL AREA NETWORKS (PANS)

CROSS REFERENCE TO RELATED APPLICATION(S)

This application claims priority from Provisional Application Serial No. 60/385,119 filed Jun. 3, 2002, which is incorporated by reference as if fully set forth.

BACKGROUND

The present invention relates to personal area networks (PANs). More particularly, the present invention is directed to method and apparatus to provide the capability of utilizing one of the devices in a personal area network as a gateway for other devices in the personal area network and to provide criteria for aid in determining advisability to make a high level handoff from one enterprise network to another to effect savings in costs and weight and volume of the PAN devices.

Personal area networks (PANs) are presently underdeveloped. One instance of such networks is the ad hoc communication of portable devices that users often carry around. As an example, a user may travel with a cell phone, personal digital assistant (PDA) portable computer (i.e., laptop) and an electronic wallet all of which fulfill specific needs for the user. The need for some or all of these devices to communicate at least occasionally with enterprise networks external to the PAN is either already a present demand or will become a natural occurrence in the immediate future. Rather than provide each such device with its own built-in capability of communicating with enterprise networks, one of the PAN devices may be selected to make the connection and act as a gateway for all of the other devices, leading to a significant saving in total device cost and weight volume needs a reduction in and complexity for all of the devices collectively.

Another developing area is the use of wireless local area networks (WLANs), which have been recognized as useful alternatives for connecting what are normally identified as wide area devices, such as cell phones, to localized hot spot areas. The ability of a device to switch between WAN and WLAN networks is being integrated into such devices.

The simultaneous use of both of the above developments in such devices has not been addressed in the marketplace but has been clearly recognized as a useful combination. Nevertheless, there are problems with switching the connection of many devices versus only switching one device between disparate networks. However, the question arises as to whether in general will the needs for each and every function be serviced by one connection be suitably serviced by the other connection and, if not, should such a switch be made.

The switching of wide area communicating devices without regard to other devices of the PAN utilizing the link may lead to many problems depending on the functions involved which include: excessive latency, insufficient data rates, excessive errors, inadequate security and high costs, for example.

SUMMARY

The present invention provides method and apparatus for establishing a high level handoff based on pre-determined criteria thereby providing a more efficient design and use of the interconnectible devices of a PAN.

BRIEF DESCRIPTION OF THE DRAWING(S)

The present invention will be better understood from a consideration of the drawings, in which like elements are designated by like numerals and, wherein.

Figure 1:
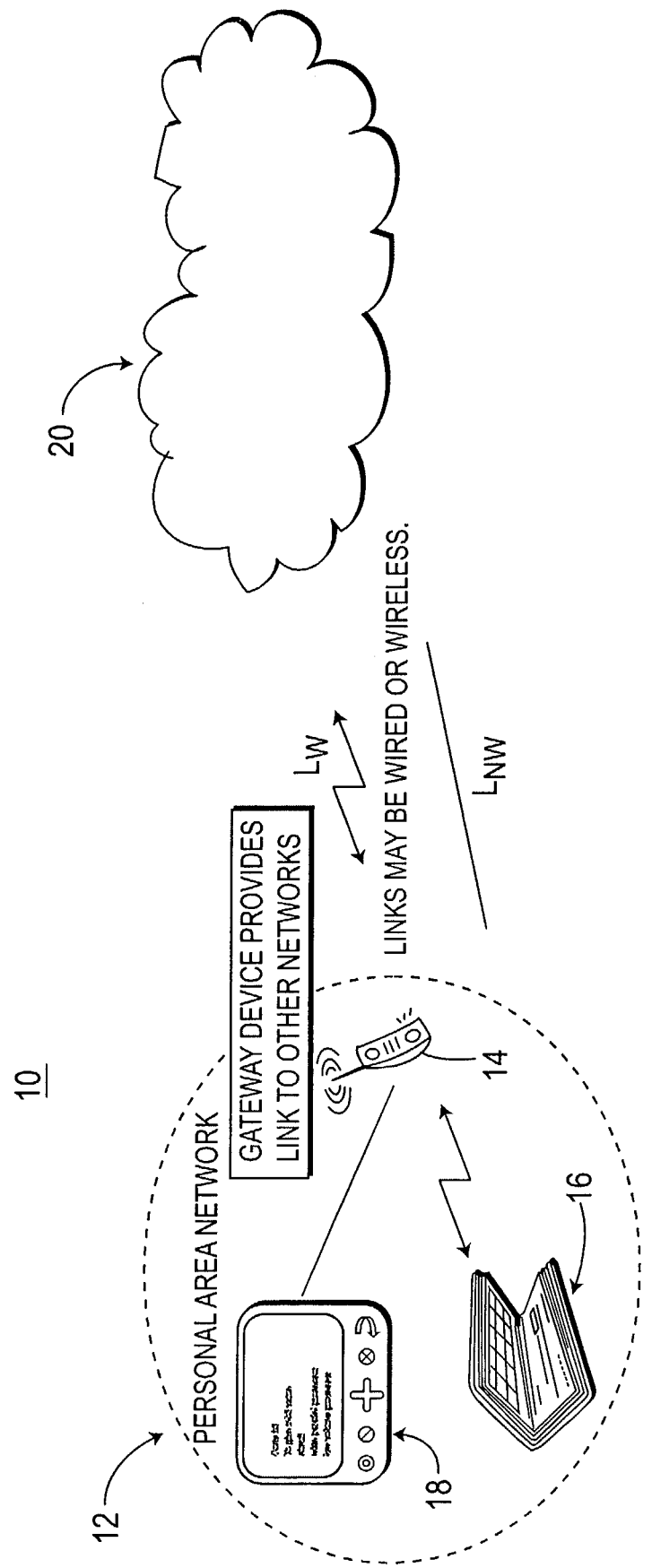
FIG. 1 shows a personal area network (PAN) in which one of the constituents of the network may be used as a gateway.
Figure 3:
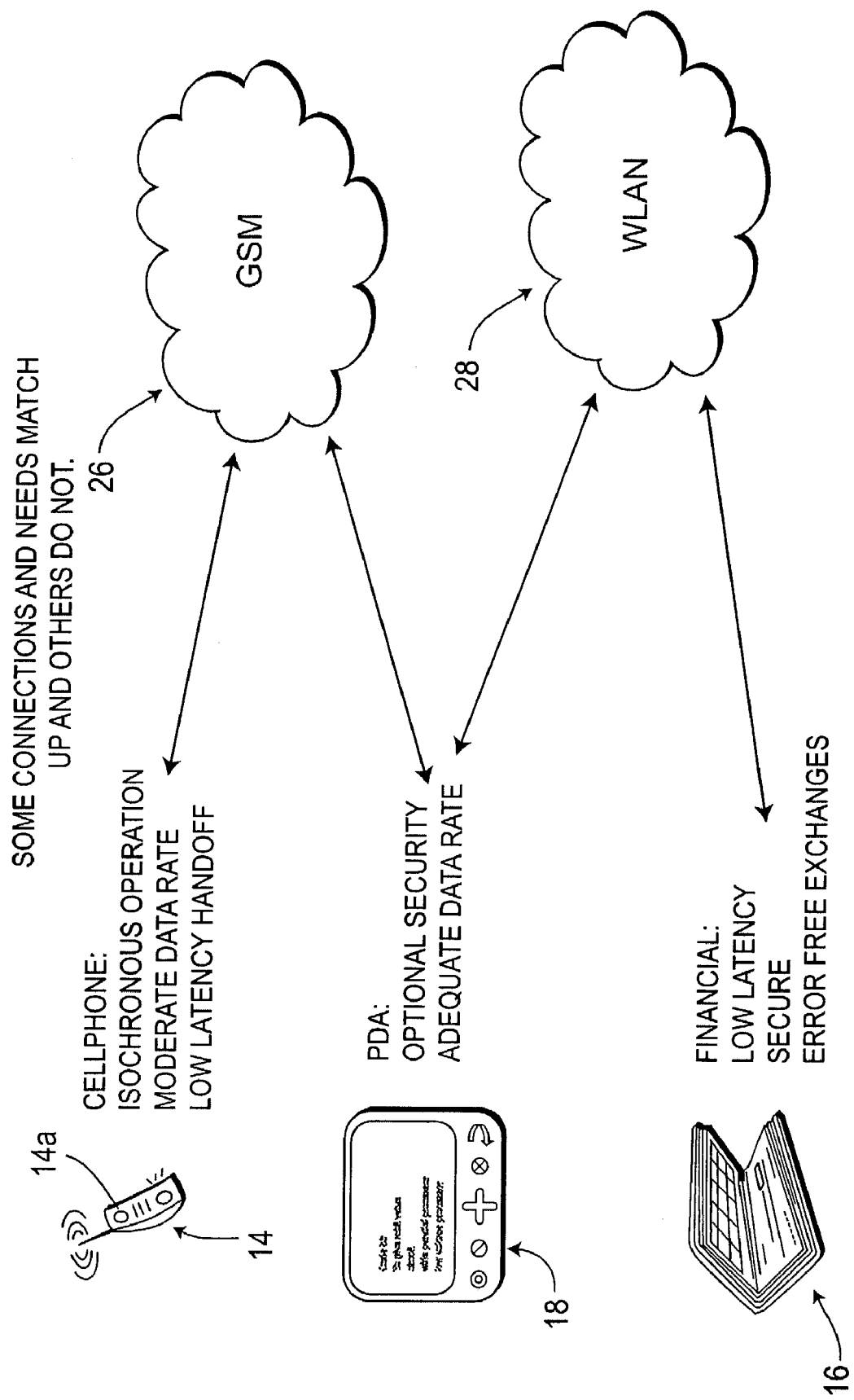

FIG. 3 shown the constituents of the personal area network (PAN) shown in FIG. 1 and the relationship of the different needs and available link capabilities.

Figure 4:
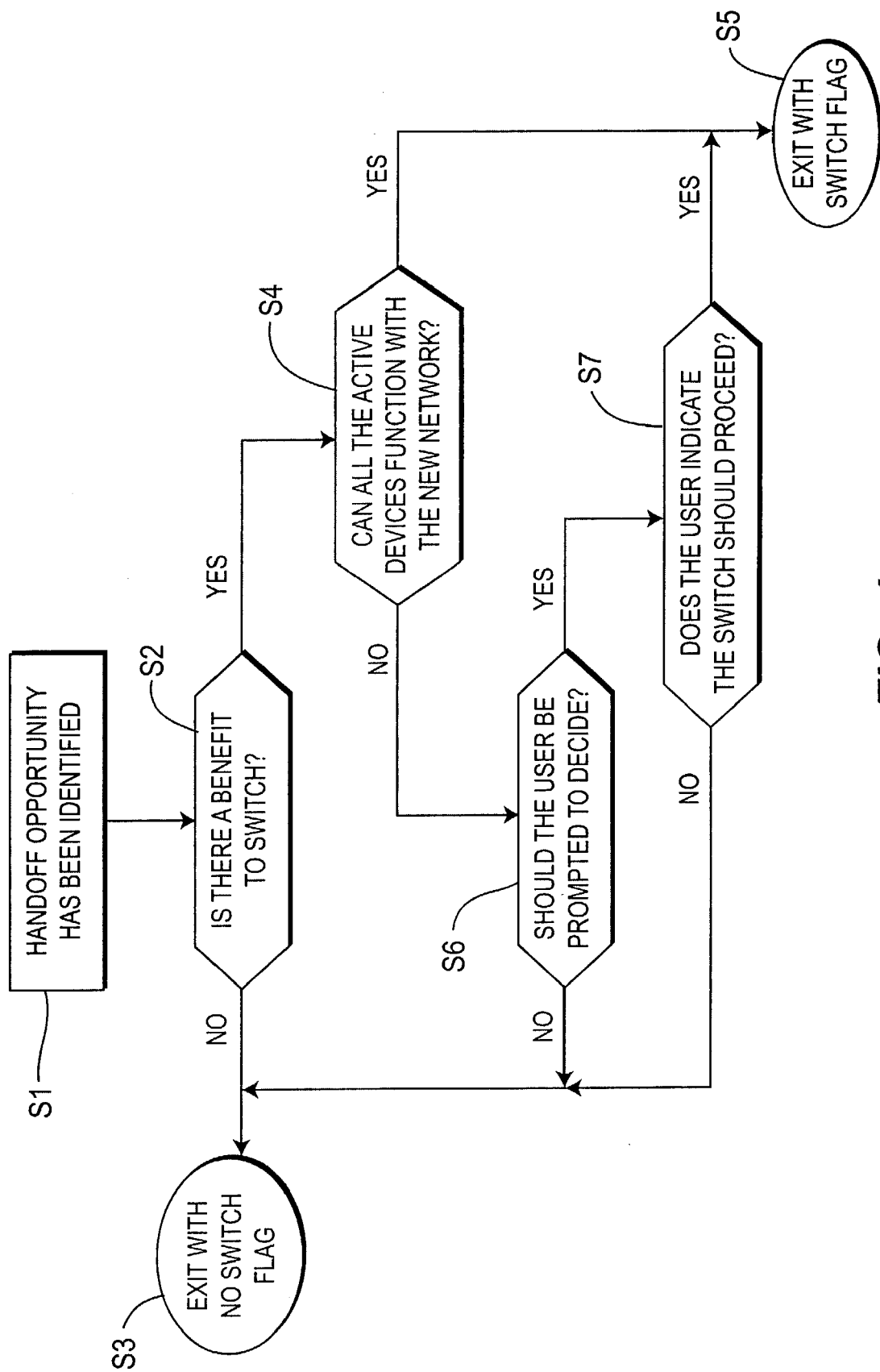

FIG. 4 is a flow diagram showing the manner in which a high level handoff decision is made based on system criteria, which procedure is preferably stored as a program in the device serving as a gateway for the PAN.

DETAILED DESCRIPTION OF THE PREFERRED EMBODIMENT(S)

FIG. 1 shows an arrangement 10 which includes a personal area network 12 which, in the embodiment shown, comprises a cell phone 14, electronic wallet 16 and personal digital assistant (PDA) 18. The PDA may alternatively be a laptop computer or the PAN may further include a laptop as shown at 19. The PAN 12 is not limited to the devices shown and may include other devices as well as a number of devices greater or lesser in number that the devices shown in FIG. 1. An enterprise network is shown at 20. The functional units of the PAN may be integrated into the same device, or use plug-ins or be coupled to one another or to the gateway device by physical or wireless links. For example, electronic wallet 16 may be coupled to cell phone 14 by a wireless link. PDA 18 may be coupled to cell phone 14 by plug-in or wired connection, such as a USB connection. All of the linkages between the members of the PAN 12 may be wired or wireless or any combination thereof.

In the example shown, cell phone 14 is selected to serve as the gateway between other components of the PAN 12 and the enterprise network 20. The link may be wireless $L_W$ or wired $L_{NW}$. For example, link $L_{NW}$ may be used when coupling to a public service telephone network (PSTN). Conventional wireless or wired interfaces presently in use may be employed for coupling of network 20 to the various components of the PAN and specifically the gateway component which, in the example shown, is a cellular phone 14.

Figure 2:
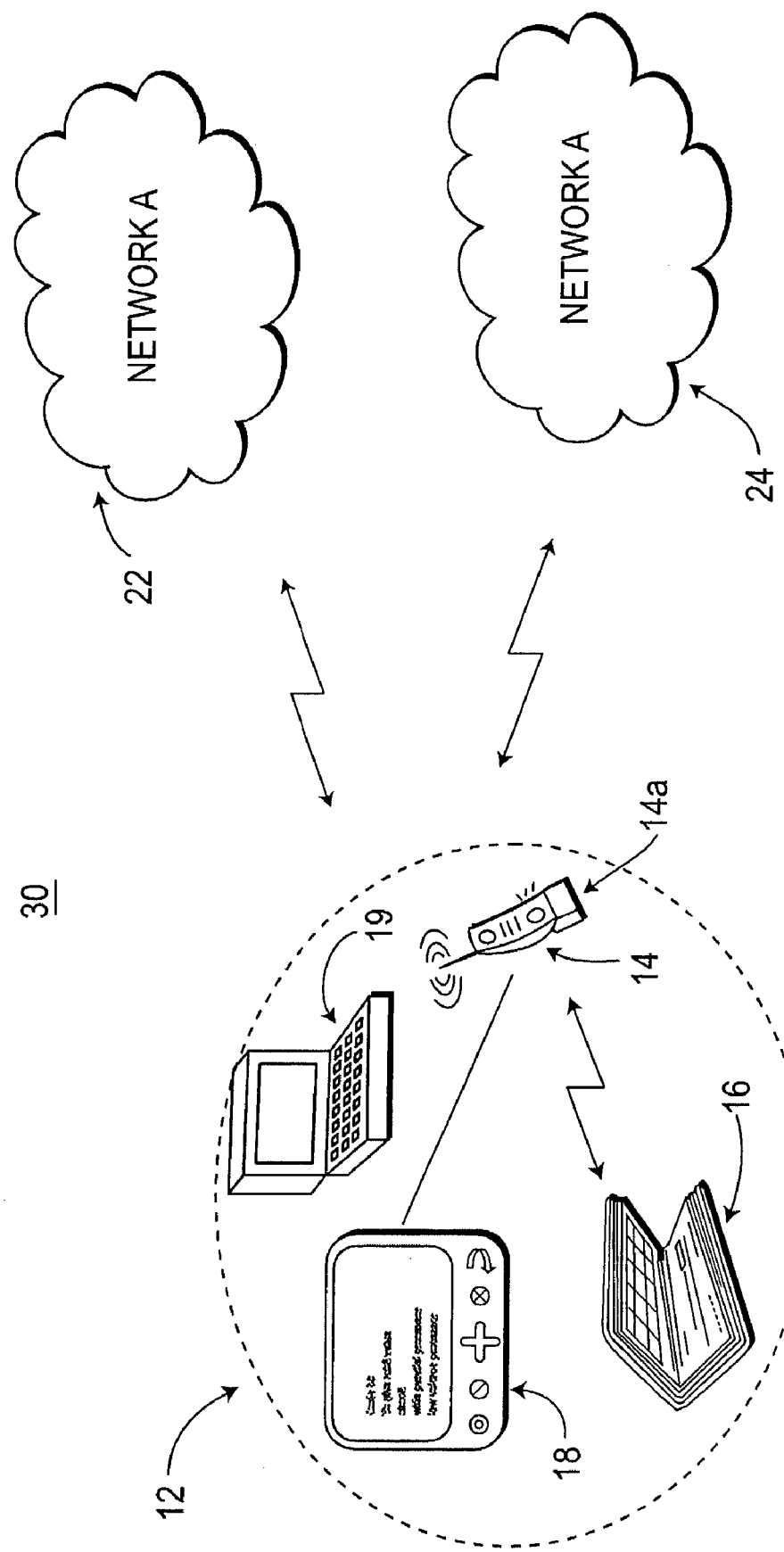
FIG. 2 shows a personal area network (PAN) similar to that shown in FIG. 1 wherein a common connection may be utilized to be switched between different networks when appropriate or necessary.

FIG. 2 shows another arrangement 30 in which the PAN 12, comprised of the components 14, 16, 18 and 19 utilizes the cellular phone 14 as the gateway component. In the example shown in FIG. 2, the opportunity often arises to transfer the common connection to another network. The gateway device 14 has the ability to be linked to multiple external networks such as network A (22) and network B (24). Nevertheless, the needs of the individual functions of the components in the PAN may not be compatible with all of the other characteristics of the link to any particular network. In this regard, FIG. 3 provides examples of different needs and available link capabilities.

For example, the desired capabilities for cell phone 14 are: isochronous operation, moderate data rate and low latency handoff. In the example given, the connections and needs of cell phone 14 adequately match with network 26 which, in the example given, is a global system for mobile communications (GSM).

The PDA 18 characteristics are optionally security and adequate data rate. These criteria are shown as being compatible with both the GSM 26 and a wireless local area network (WLAN) 28.

The characteristics of the electronic checkbook are low latency, security and error free exchanges which, in the example shown, are compatible only with the WLAN 28.

Therefore it becomes extremely advantageous to provide the gateway device with decision-making capability which takes into account the other devices of the PAN desiring to utilize the link to be created.

The requirements and link capabilities may be stored in a program within the gateway device to facilitate a decision either independently of the user or based upon the user's selection. Although the gateway device shown herein is a cell phone, another device may be selected as the gateway device, dependent upon the particular application, the capability of the devices (e.g. available links, power availability, processing capability), and/or the user's preference.

FIG. 4 is a flow diagram of the program utilized to facilitate a high level handoff decision.

At step S1 where a handoff opportunity has been identified, the program advances to step S2, either automatically or through user initiated action, to determine if there is any benefit to switching, for example, from network 26 to 28 (or vice versa). This decision is made by examining the criteria for the handoff, which may include, but is not limited to: latency, data rates, security, distance, signal strength. Assuming, after the examination of the stored criteria, there is no benefit to switching, the program jumps to step S3, causing an exit in the program with no setting of a switch flag which may, for example, provide a display of a single lamp or LED or a word or words or other indicia provided on the display 14a of the cell phone 18 and/or an audible message provided through a speaker 14b of the cell phone 14.

Assuming, on the other hand, that, based on the stored criteria, the benefit to performing a switch operation is established, the program jumps to step S4 to determine whether all the active devices are capable of functioning with, i.e. are compatible with, the new network. The criteria necessary for arriving at such decision is stored in the memory (not shown for purposes of simplicity) within the cell phone 14 or may be a plug-in or add-on 14a to the cell phone 14 shown in FIG. 2. Assuming that the stored criteria shows that all of the active devices are capable of functioning with the new network, the program jumps to step S5, whereupon the "switch flag" is selected and switching is automatically undertaken prior to exiting the program. Alternatively, the switch flag display may prompt the user to manually initiate the switch from the previous enterprise network to the selected network. The hand-off may be performed in accordance with current technology, such as AAA mobility management and context transfer procedures.

Assuming that not all of the active devices are capable of functioning with the new network, the program jumps from junction step S4 to step S6. At this step, the program refers to criteria stored for determining whether it is appropriate to prompt the user to make the decision, which criteria may, for example, be the number of PAN devices which are compatible, prioritizing importance of the PAN devices, etc.

Assuming the criteria examined establishes that the user should not be prompted to decide, the program jumps to step S3 and exiting therefrom with no "switch flag."

Assuming, however, that the criteria establishes that the user should be prompted to decide, the program jumps to step S7 whereupon a display is given to the user inquiring as to whether the switch to another network should proceed. The user, upon observing the query, which may be accompanied by a sound message stored within the cell phone 14 or alternatively be limited to either a sound message or a visual display, selects as to whether the switching should proceed by to branching to step S5 or that no switching should occur, thereby branching to step S3.

The technique of the present invention is not limited to use for switching from one network to another and may also be employed to facilitate selection of one of a plurality of networks greater than two (2) to be linked with the gateway device.

This novel technique/arrangement greatly facilitates, simplifies and speeds up the decision making process.

What is claimed is:

1. A method for facilitating high level handoff decisions performed by one of a group of devices in a personal area network (PAN) serving as a gateway between other ones of the group of devices of the PAN and at least one enterprise network, comprising a program associated with the gateway device which:
   a) examines a first type of a criteria to determine if there is a benefit to switching from one enterprise network to another network when a handoff opportunity is recognized;
   b) examines a second type of criteria which may include some of the criteria of the first group, relating to the new network and the devices within the PAN to determine if all of the devices function within the new network and
   c) generates a given condition when the criteria examined during step (b) indicates that all devices of the PAN will function with said another network and
   d) examining a third set of criteria when not all of the devices are compatible with said another network.

2. Apparatus for facilitating high level handoff decisions performed by one of a group of devices in a personal area network (PAN) designated to serve as a gateway between the other devices of the PAN and at least one enterprise network, said gateway device comprising;
   first means for examining a first type of criteria to determine if there is a benefit to switching from on enterprise network to another network when a handoff opportunity is recognized;
   second means for examining a second type of criteria which may include some of the criteria of the first group, relating to the new network and the devices within the PAN to determine if all of the devices function within the new network and
   third means for examining a given condition when the criteria examined by said second means indicates that all devices of the PAN will function with said another network,
   wherein said second means provides an inquiry to the gateway device requesting a user response regarding a switching operation when at least one of the devices in said group is not compatible with a network recommended by said first means.

3. The apparatus of claim 2 wherein means for initiating a handoff operation is enabled responsive to a user response.

4. The apparatus of claim 2 wherein means for preventing a handoff operation is enabled responsive to a user response.

* * * * *

UNITED STATES PATENT AND TRADEMARK OFFICE
CERTIFICATE OF CORRECTION

| | |
|---|---|
| PATENT NO. | : 7,039,408 B2 |
| APPLICATION NO. | : 10/447891 |
| DATED | : May 2, 2006 |
| INVENTOR(S) | : Chitrapu et al. |

Page 1 of 1

It is certified that error appears in the above-identified patent and that said Letters Patent is hereby corrected as shown below:

At column 2, line 15, after "Fig.3", delete "shown" and insert therefor --shows--.

At column 4, line 9, after the word "by", delete "to".

In claim 2, column 4, line 45, after the word "from", delete "on", and insert therefor --one--.

Signed and Sealed this

Twelfth Day of December, 2006

JON W. DUDAS
*Director of the United States Patent and Trademark Office*